US011724596B1

(12) United States Patent
Diamond et al.

(10) Patent No.: US 11,724,596 B1
(45) Date of Patent: Aug. 15, 2023

(54) SYSTEMS AND METHODS FOR ROAD DISTURBANCE DETECTION AND TORQUE VECTORING CONTROL

(71) Applicant: Ford Global Technologies, LLC, Dearborn, MI (US)

(72) Inventors: Brendan Diamond, Grosse Pointe, MI (US); Keith Weston, Canton, MI (US); Aaron L. Mills, Ann Arbor, MI (US); Jordan Barrett, Milford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/158,970

(22) Filed: Jan. 24, 2023

(51) Int. Cl.
*B60W 40/06* (2012.01)
*B60K 23/08* (2006.01)

(52) U.S. Cl.
CPC .... *B60K 23/0808* (2013.01); *B60K 2023/085* (2013.01); *B60K 2023/0833* (2013.01); *B60W 40/06* (2013.01); *B60W 2720/40* (2013.01)

(58) Field of Classification Search
CPC .......... B60K 23/0808; B60K 2023/085; B60K 2023/0833; B60W 40/06; B60W 2720/40
See application file for complete search history.

(56) References Cited

U.S. PATENT DOCUMENTS

| | | |
|---|---|---|
| 8,521,349 B2 | 8/2013 | Yu et al. |
| 9,751,401 B2 * | 9/2017 | Ganchev ............... B60K 17/34 |
| 11,021,068 B2 | 6/2021 | Shindo et al. |
| 2011/0015844 A1 * | 1/2011 | Perkins ............... B60T 8/17554 701/69 |
| 2016/0264019 A1 * | 9/2016 | Drako .................. B60K 17/356 |
| 2017/0233001 A1 | 8/2017 | Moshchuk et al. |
| 2020/0255017 A1 * | 8/2020 | Siokos ................. B60K 17/354 |
| 2022/0097682 A1 | 3/2022 | Anderson et al. |

FOREIGN PATENT DOCUMENTS

| | | | | |
|---|---|---|---|---|
| CN | 107985318 A | * | 5/2018 | .......... B60W 40/105 |
| CN | 114425946 A | | 5/2022 | |
| DE | 102012222197 A1 | * | 6/2014 | ......... B60K 23/0808 |

OTHER PUBLICATIONS

Yue Ren et al., Integrated Model Predictive and Torque Vectoring Control for Path Tracking of 4-Wheel-Driven Autonomous Vehicles, IET Journals, vol. 13, Iss 1, Sep. 20, 2018, pp. 98-107.
Kiumars Jalali et al., Development of an Advanced torque Vectoring Control System for an Electric Vehicle with In-Wheel Motors Using Soft computing Techniques, SAE International, vol. 2, Issue 2, Apr. 8, 2013, pp. 261-278.

* cited by examiner

*Primary Examiner* — Justin Holmes
(74) *Attorney, Agent, or Firm* — Frank Lollo; Eversheds Sutherland (US) LLP

(57) ABSTRACT

Systems and methods for road disturbance detection and torque vectoring control. A vehicle may comprise: a torque vectoring system for independently varying torque to a plurality of wheels, an external sensor suite, and an electronic control unit. The control unit may comprise one or more processors and memory storing executable instructions that, as a result of execution by the one or more processors, cause the one or more processors to implement an appropriate torque vectoring strategy. The torque vectoring strategy may comprise biasing torque towards or away from a wheel/motor/axle.

20 Claims, 4 Drawing Sheets

SYSTEMS AND METHODS FOR ROAD DISTURBANCE DETECTION AND TORQUE VECTORING CONTROL

BACKGROUND

Many roads have bumps, potholes, and other disturbances that can affect the smoothness of a ride. Techniques for providing a smoother ride in the presence of road disturbances are, therefore, desirable.

BRIEF DESCRIPTION OF THE DRAWINGS

A detailed description is set forth regarding the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
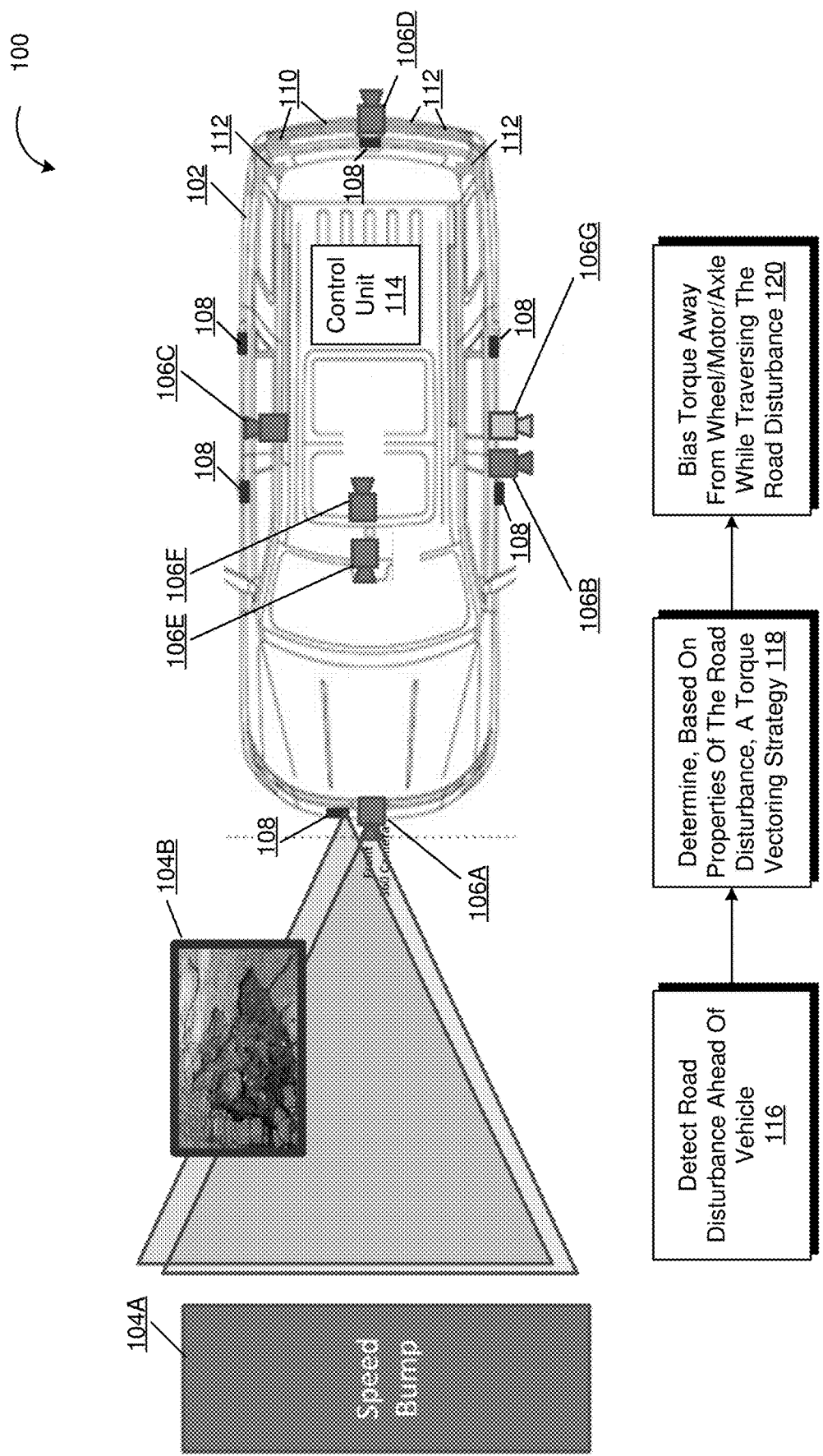
FIG. 1 illustrates a diagram 100 in which road disturbance and torque vectoring control techniques may be practiced, according to at least one embodiment.

The present disclosure is directed to systems and methods for road disturbance detection and torque vectoring control. Vehicle responsiveness may be enhanced in various road conditions. As described in greater detail below, torque redistribution techniques may be applied to mitigate the effect of road disturbances.

When traversing over road disturbances, such as bumps, potholes, metal plates, and other road disturbances, if a vehicle is applying torque, especially a high magnitude of torque, the vehicle can experience a sharp motion. This may result in a less than ideal riding experience. Techniques described herein may relate to torque vector control that reduces the torque application for a wheel or axle that is traversing a road disturbance. As a result, occupants in a vehicle may experience a more enjoyable ride.

One aspect of the present disclosure relates to using an exterior sensor suite of a vehicle to scan/identify road disturbances. The exterior sensors may include cameras, radar, LIDAR, and so on and so forth. The sensors may be used to determine various properties of road disturbances, such as depth, width, height, shape, etc., of road disturbances.

One aspect of the present disclosure relates to estimating the time until the road disturbance is reached for each axle of a vehicle on the basis of vehicle speed and distance.

One aspect of the present disclosure relates to torque vectoring control strategies that involves adjusting the torque split to bias torque away from an axle of a vehicle as it traverses over a road disturbance. As a result, the comfort of the ride may be enhanced.

One aspect of the present disclosure relates to determining the vehicle trajectory through the road disturbance by using the steerable path polynomial feature.

One aspect of the present disclosure relates to the vehicle monitoring the command/estimate driver wheel torque needed to accelerate the vehicle or to maintain the current vehicle speed.

One aspect of the present disclosure relates to the vehicle comparing the estimated/commanded wheel torque to the wheel torque capability of each axle/motor to determine if a singular axle is capable of meeting the driver demand torque.

One aspect of the present disclosure relates to calibration thresholds required if the driver demands torque is beyond a "high wheel torque" or "low wheel torque".

One aspect of the present disclosure relates to determining information regarding road disturbances on tight/blind curve vehicles using Road Experience Management (REM) Roadbook data to determine expected road disturbances on the driver's path.

One aspect of the present disclosure relates to limiting the amount of torque re-distribution under reduced friction scenarios to minimize yaw or wheel slip that might be induced by the torque redistribution.

ILLUSTRATIVE EMBODIMENTS

In at least one embodiment, multi-disciplinary systems and methods are devised for road disturbance detection and torque vectoring control. The overall methodology comprises monitoring road conditions to identifying a road disturbance ahead of the vehicle, determining which wheels of the vehicle will encounter the road disturbance, estimating a time until the road disturbance will be reached by the front and/or rear wheels of the vehicle, performing a first torque adjustment to bias torque towards the rear axle of the vehicle when the front axle traverses the road disturbance (e.g., 0/100 torque split), performing a second torque adjustment to change the torque bias after the front axle has traversed the road disturbance (e.g., 0/100 to 100/0), and then performing a third torque adjustment after both the front and rear axles have traversed the road disturbance to return to the original torque split as from before the road disturbance was encountered, according to at least one embodiment.

FIG. 1 illustrates a diagram 100 in which road disturbance and torque vectoring control techniques may be practiced, according to at least one embodiment.

A vehicle 102 may be any suitable vehicle, including autonomous vehicles. Vehicle 102 may comprise a suite of exterior sensors such as a front 360-degrees camera 106A, driver 360-degrees camera 106B, passenger 360-degrees camera 106C, rear camera 106D, Lane Departure Warning (LDW) and Lane Keeping Assist (LKA) camera(s) 106E, dashboard interior camera 106F, driver door facial recognition camera 106G and more. FIG. 1 should be taken as an illustrative, non-limiting example of the types of sensors that may be incorporated into vehicle 102 and fewer or greater numbers and/or types of cameras may be utilized in various implementations contemplated in the scope of this disclosure. In various embodiments, a vehicle comprises a suite of exterior sensors that may be used to identify road disturbances. These sensors may be used to determine when and how to reduce torque application to axles as they traverse over the road disturbance, thereby to enhance the vehicle ride.

While the vehicle is driving on a route, a vehicle will use the exterior sensor suite including cameras 106A-106G, radar sensors 108, ultrasonic sensors 110, Blind Spot Information System (BLISS) sensors 112, LIDAR to scan the road in front of the vehicle, according to various embodiments. During this scan, the vehicle will identify road disturbances and quantify each road disturbance into various types. Road disturbances can include degradation of roads (potholes, cracks, etc.), speed bumps, puddles, ice/snow, or abnormal surface texture (filled in pothole), as illustrative, non-limiting examples. Once a road disturbance is identified, the severity of the road disturbance may be estimated based on various factors such as depth, width, height, shape, etc., of each road disturbance. For example, steeper drops and/or larger depth or height parameters may indicate a higher severity road disturbance.

Road disturbances are illustrated in FIG. 1 as speed bump 104A and pothole 104B. Road disturbances may exist for a variety of reasons, such as intended speed bumps and unintended potholes. Vehicle 102 may comprise a control unit 114 that is able to identify the location of road disturbances. The control unit 114 may comprise one or more processors and memory storing executable instructions that, as a result of execution by the one or more processors, cause the one or more processors to perform torque vectoring techniques described herein, for example, in connection with FIG. 3. An exterior sensor suite of cameras, radar, LIDAR, etc. may be used to scan the road ahead of a vehicle to identify the location of road disturbances and properties of the road disturbances such as depth, width, height, shape, etc. These properties may be used to determine an appropriate torque vectoring strategy. In some embodiments, road disturbances may be identified based on data that is collected from external sources. For example, REM/Roadbook can essentially act as an onboard digital map—road disturbances such as potholes will be in this dataset, and therefore the vehicle can react to the upcoming disturbance before the disturbance has entered the driver's/sensor suite's field of view. This may be utilized in scenarios where the vehicle is approaching a tight turn or blind curve and there is insufficient time for the vehicle to visually identify the road disturbance and apply an appropriate or desired torque vectoring strategy.

In various embodiments, a torque vectoring strategy comprises a step 116 to identify a road disturbance ahead of the vehicle. A road disturbance (e.g., speed bump 104A or pothole 104B) is identified by a vehicle's on-board control unit and the vehicle will then estimate the time until the road disturbance is reached for each axle of the vehicle. The vehicle will estimate this time based on the current vehicle speed and distance to the road disturbance. The vehicle will also determine the vehicle trajectory such if it is expected to drive through the road disturbance by using the steerable path polynomial feature. The "Most Probable Path" feature can also be used to determine if the driver is expected to traverse through the road disturbance. For example if a pothole is detected as being directly ahead of the vehicle but has a narrow width, then the vehicle may proceed without performing any torque adjustments.

The vehicle may estimate the road friction based on some combination of road friction estimation mechanisms (e.g. ambient temperature, vision cues, cloud/crowd-sourced inputs, measured vehicle dynamics, etc.). The vehicle may also monitor the commanded driver wheel torque or estimate the wheel torque needed to accelerate to a speed or maintain a speed if this feature is being used while autonomous driving features are activated.

Torque vectoring strategies may be implemented by a control unit of a vehicle according to techniques described below in greater detail. In general, a torque vectoring differential involves transmitting torque independently between wheels. This torque transferring ability enhances traction when torque is transferred to a rear axle when a front axle traverses a road bump or other road disturbance. In various embodiments, torque vectoring allows for independently varying of torque to each wheel. Differentials generally consist of only mechanical components. A torque vectoring strategy as described herein may be implemented using an electronics control unit that controls when and how to vary the torque. Due to the number of wheels that receive power, a front or rear wheel drive differential is less complex than an all-wheel drive differential. A result of torque distribution is the generation of yaw moment arising from longitudinal forces and changes to the lateral resistance generated by each tire. Applying more longitudinal force reduces the lateral resistance that can be generated. The function is independent of technology and could be achieved by driveline devices for a conventional powertrain, or with electrical torque sources.

In various embodiments, step 118 involves determining, based on properties of the road disturbance, vehicle, weather, etc. a torque vectoring strategy. Vehicle 102 may compare the estimated/commanded wheel torque to the wheel torque capability of each axle/motor/wheel to determine if a singular axle/motor/wheel is capable of meeting the driver demand torque. The vehicle will, according to various embodiments, then perform the following actions: first, the vehicle will bias the torque split (e.g., perform torque vectoring) such that the axle/motor/wheel that will traverse over the road disturbance is not applying torque or apply a smaller magnitude of torque. For example, the torque magnitude may be reduced (but not zeroed) when a singular axle is not able to meet the driver's demand torque.

If the desired torque is beyond the capability of a singular axle/motor/wheel, the torque split can be biased away from the motor/axle/wheel traversing the road disturbance to a certain degree such as switching from a 50/50 torque split to a 25/75 torque split such that the vehicle can also bias torque away from to a degree and cannot completely ramp out torque so as to prevent torque application or limit torque application to a lower amount until the vehicle is completely past the road disturbance.

Step 120 may involve determining when the vehicle is expected to traverse the road disturbance based on the current vehicle speed and distance to the road disturbance. When the vehicle traverse the road disturbance, torque may be biased away from the axle/wheel/motor as it traverses over the road disturbance. For example, in an all-wheel drive vehicle, an initial torque split of 50/50 between front axle and rear axle may be adjusted to a 0/100 bias when the front axle traverses a road bump (i.e., causing the torque to be entirely shifted to the rear axle) and then adjusted to 100/0 when the rear axle traverses the road bump (i.e., causing the torque to be entirely shifted to the front axle) and then adjusted to 50/50 after the rear wheel has traversed the road bump. Such a scenario is discussed in greater detail below, in connection with FIG. 2.

In various embodiments, a torque vectoring strategy comprises identification and prioritization of road disturbances. For example, consider the scenario in which a pothole 104B is nearby a speed bump 104A and close enough that both would be traversed within a short distance and/or period of time such that it would not be possible to simultaneously implement discrete torque vectoring strategy for both road disturbances. In such a scenario, the road disturbances that the vehicle responds to may be determined based on which road disturbance is of a greater realized severity.

Additional aspects of the present disclosure may be described below. In various embodiments, a torque vectoring system can be calibrated to be enabled/disabled only when the feature would benefit the driver/occupants of the vehicle. If the road disturbance is minimal (e.g., does not meet a minimum severity), this feature can remain disabled. Calibration thresholds can be built into this feature such that if the driver demand torque is beyond a "high wheel torque" or "low wheel torque" threshold, this feature would not be activated to ensure the vehicle is able to provide full wheel torque capability when requested. This also ensures the vehicle will not bias torque substantially if the wheel torque is very low and the benefit from the feature activation would be minimal/unnoticeable.

In various embodiment, the amount of torque re-distribution is limited under reduced friction scenarios to minimize yaw or wheel slip that might be induced by the torque redistribution.

Figure 2:
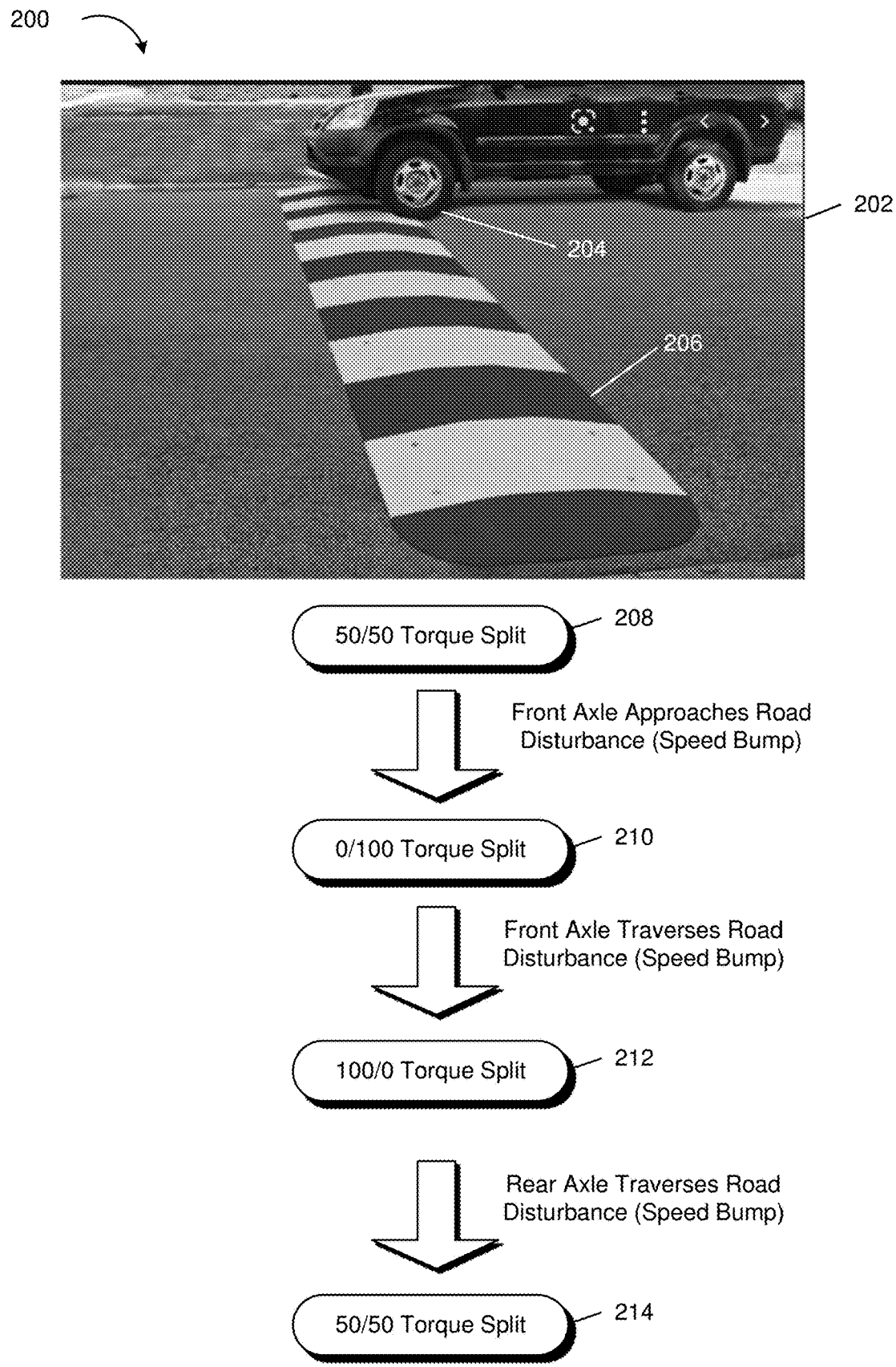
FIG. 2 illustrates a diagram 200 in which a torque vectoring strategy is implemented, according to at least one embodiment.

FIG. 2 illustrates a diagram 200 in which a torque vectoring strategy is implemented, according to at least one embodiment.

FIG. 2 depicts an environment 202 in which a vehicle such as vehicle 102 described in connection with FIG. 1 traverses a speed bump 204. Prior to reaching speed bump 204, the vehicle may use various sensors or datasets to identify the speed bump 204 as a road disturbance that the vehicle will traverse. Based on the vehicle's speed, distance to speed bump, width of the speed bump, and other properties, a torque vectoring strategy may be determined. For example, the vehicle's on-board electronic control unit may calculate when the front axle 206 of the vehicle will reach speed bump 204, how long it will take for the front axle to completely traverse the speed bump 204, when the rear axle will reach speed bump 204, how long it will take for the rear axle to completely traverse the speed bump 204, and so on and so forth.

Prior to reaching the speed bump 204, the vehicle may be operating with a default torque split 208. As depicted in FIG. 2, the default torque split may be a 50/50 torque split that applies equally between a front axle and rear axle.

When the front axle approaches the road disturbance, a first adjustment may be made to bias the torque towards the rear axle. In various embodiments, a control unit (e.g., as described in connection with FIG. 1) provides torque biasing capabilities and is implemented as a computer-based system that controls how much power a vehicle's engine or motors sends to individual wheels or axels. Calibration thresholds can be built into this feature such that if the driver demand torque is beyond a "high wheel torque" or "low wheel torque" threshold, this feature would not be activated to ensure the vehicle is able to provide full wheel torque capability when requested. This also ensures the vehicle will not bias torque substantially if the wheel torque is very low and the benefit from the feature activation would be minimal/unnoticeable. Assuming that the calibration threshold is not violated, a 0/100 torque split 210 may be applied so that the torque is biased towards the rear axle. If the desired torque is beyond the capability of a singular axle, the torque split can be biased away from the axel traversing the road disturbance to a certain degree such as switching from a 50/50 torque split to a 25/75 torque split such that the vehicle can also bias torque away from to a degree and cannot completely ramp out torque so as to prevent torque application or limit torque application to a lower amount until the vehicle is completely past the road disturbance. In various embodiments, a vehicle (e.g., via its control unit) may be configured to determine an estimated torque needed to traverse the road disturbance; determine a torque capability of the rear axle, determine whether the rear axle is capable of meeting the estimated torque needed to traverse the road disturbance, in response to a determination that the rear axle is capable, cause the torque to be entirely shifted to the rear axle at the first time, and in response to a determination that the rear axle is incapable, cause the torque to be partially shifted to the rear axle at the first time (e.g., a 25/75 split as described above).

Upon the front axle traversing the road disturbance, a second torque adjustment may be made to bias to torque towards the front axle and away from the back axle. For example, the torque split may be adjusted from a 0/100 torque split to a 100/0 torque split 212. Once the rear axle has traversed the road disturbance, the original 50/50 torque split 214 may be restored. In various embodiments, a control unit comprising one or more processors is configured to determine an original torque split (e.g., at a first time prior to reaching the road disturbance) and causing the original torque split to be restored after the rear axle of the vehicle traverses the road disturbance.

Figure 3:
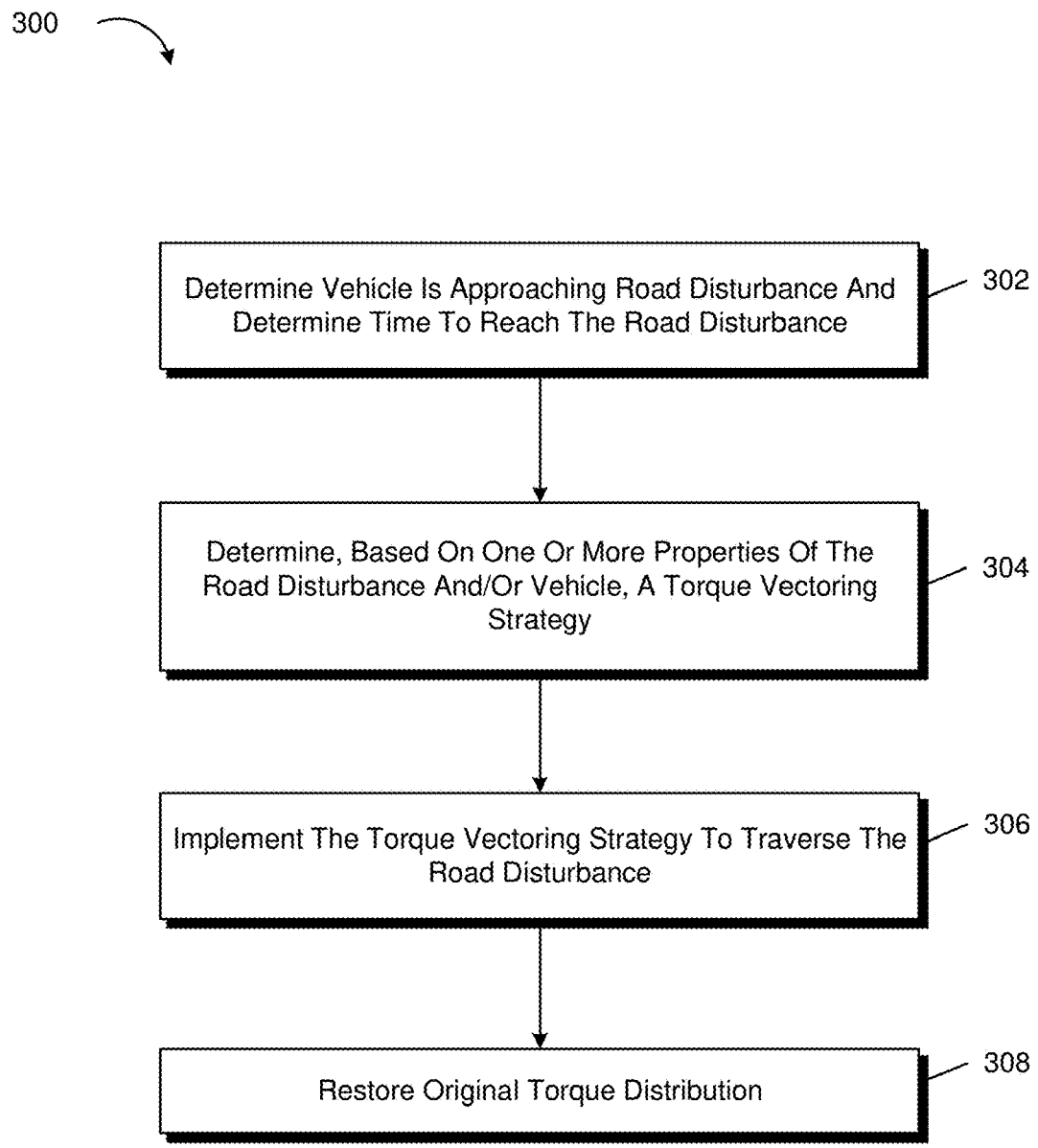
FIG. 3 shows an illustrative example of a process 300 for road disturbance and torque vectoring control, in accordance with one or more example embodiments of the present disclosure.
Figure 4:
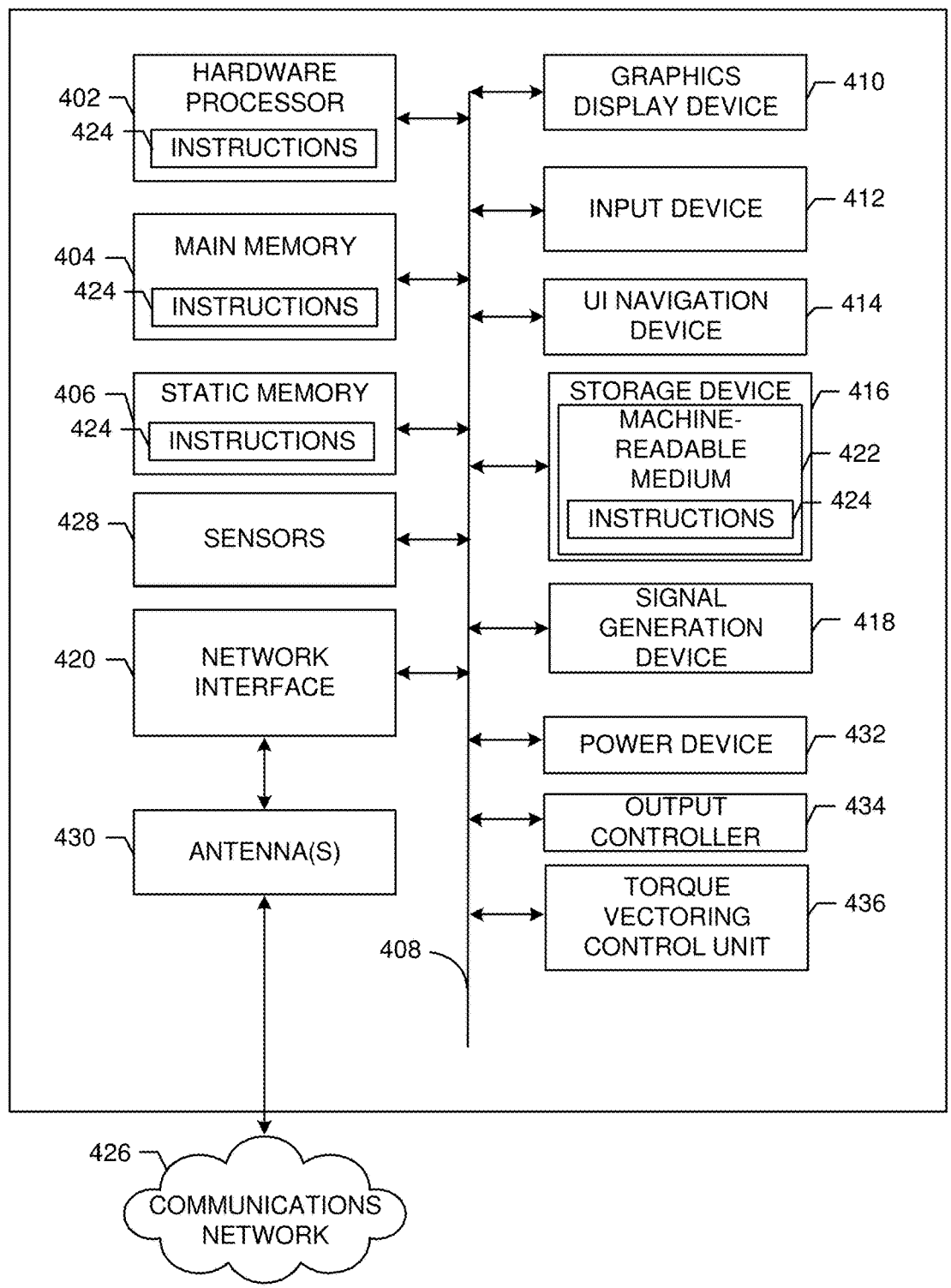
FIG. 4 illustrates a block diagram of an example of a machine 400 or system upon which any one or more of the techniques (e.g., methodologies) discussed herein may be performed.

FIG. 3 shows an illustrative example of a process 300 for road disturbance and torque vectoring control, in accordance with one or more example embodiments of the present disclosure. In at least one embodiment, some or all of the process 300 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program storing a plurality of computer-readable instructions executable by one or more processors. The computer-readable storage medium, in at least one embodiment, is a non-transitory computer-readable medium. In at least one embodiment, at least some of the computer-readable instructions usable to perform the process 300 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 300 may be implemented in the context of various systems and methods described elsewhere in this disclosure, such as those discussed in connection with FIGS. 1-2. In at least one embodiment, process 300 or a portion thereof is collectively implemented by a torque vectoring system of a vehicle. In at least one embodiment, process 300 is performed by a control unit comprising: one or more processors; and memory storing executable instructions that, as a result of execution by the one or more processors, cause the one or more processors to perform some or all of the steps depicted in FIG. 3

In various embodiments, process 300 comprises a step 302 to determine vehicle is approaching road disturbance and determine time to reach the road disturbance. An exterior sensor suite of cameras, radar, LIDAR, etc. may be used to scan the road ahead of a vehicle to identify the location of road disturbances and properties of the road disturbances such as depth, width, height, shape, etc. These properties may be used to determine an appropriate torque vectoring strategy. In some embodiments, road disturbances may be identified based on data that is collected from external sources. For example, REM/Roadbook can essentially act as an onboard digital map—road disturbances such as potholes will be in this dataset, and therefore the vehicle can react to the upcoming disturbance before the disturbance has entered the driver's/sensor suite's field of view. This may be utilized in scenarios where the vehicle is approaching a tight turn or blind curve and there is insufficient time for the vehicle to visually identify the road disturbance.

When a road disturbance (e.g., speed bump or pothole) is identified by a vehicle's on-board control unit and the vehicle will then estimate the time until the road disturbance is reached for each axle of the vehicle. The vehicle may estimate this time based on the current vehicle speed and distance to the road disturbance. In various embodiments, the vehicle will also determine the vehicle trajectory such if it is expected to drive through the road disturbance by using the steerable path polynomial feature. The "Most Probable Path" feature can also be used to determine if the driver is expected to traverse through the road disturbance. For example if a pothole is detected as being directly ahead of the vehicle but has a narrow width, then the vehicle may proceed without performing any torque adjustments.

In various embodiments, process 300 comprises a step 304 determine, based on one or more properties of the road disturbance and/or vehicle, a torque vectoring strategy. A torque vectoring strategy may be determined using an electronics control unit that controls when and how to vary the torque for a vehicle. Due to the number of wheels that receive power, a front or rear wheel drive differential is less complex than an all-wheel drive differential. A result of torque distribution is the generation of yaw moment arising from longitudinal forces and changes to the lateral resistance generated by each tire. Applying more longitudinal force reduces the lateral resistance that can be generated. The function is independent of technology and could be achieved by driveline devices for a conventional powertrain, or with electrical torque sources.

The torque vectoring system may compare the estimated/commanded wheel torque to the wheel torque capability of each axle/motor/wheel to determine if a singular axle/motor/wheel is capable of meeting the driver demand torque. The vehicle will, according to various embodiments, then perform the following actions: first, the vehicle will bias the torque split (e.g., perform torque vectoring) such that the axle/motor/wheel that will traverse over the road disturbance is not applying torque or apply a smaller magnitude of torque. For example, the torque magnitude may be reduced (but not zeroed) when a singular axle is not able to meet the driver's demand torque.

If the desired torque is beyond the capability of a singular axle/motor/wheel, the torque split can be biased away from the motor/axle/wheel traversing the road disturbance to a certain degree such as switching from a 50/50 torque split to a 25/75 torque split such that the vehicle can also bias torque away from to a degree and cannot completely ramp out torque so as to prevent torque application or limit torque application to a lower amount until the vehicle is completely past the road disturbance.

In various embodiments, process 300 comprises a step 306 perform the torque vectoring strategy to traverse the road disturbance. Based on the time when the vehicle is expected to traverse the road disturbance, torque may be biased away from the axle/wheel/motor as it traverses over the road disturbance. For example, in an all-wheel drive vehicle, an initial torque split of 50/50 between front axle and rear axle may be adjusted to a 0/100 bias when the front axle traverses a road bump and then adjusted to 100/0 when the rear axle traverses the road bump and then adjusted to 50/50 after the rear wheel has traversed the road bump. In various embodiments, a torque vectoring strategy comprises identification and prioritization of road disturbances. For example, consider the scenario in which a pothole is nearby a speed bump and close enough that both would be traversed within a short distance and/or period of time such that it would not be possible to simultaneously implement discrete torque vectoring strategy for both road disturbances. In such a scenario, the road disturbances that the vehicle responds to may be determined based on which road disturbance is of a greater realized severity.

Additional aspects of the present disclosure may be described below. In various embodiments, a torque vectoring system can be calibrated to be enabled/disabled only when the feature would benefit the driver/occupants of the vehicle. If the road disturbance is minimal, this feature can remain disabled. Calibration thresholds can be built into this feature such that if the driver demand torque is beyond a "high wheel torque" or "low wheel torque" threshold, this feature would not be activated to ensure the vehicle is able to provide full wheel torque capability when requested. This also ensures the vehicle will not bias torque substantially if the wheel torque is very low and the benefit from the feature activation would be minimal/unnoticeable.

In various embodiment, the amount of torque re-distribution is limited under reduced friction scenarios to minimize yaw or wheel slip that might be induced by the torque redistribution.

In various embodiments, process 300 comprises a step 308 restore the original torque distribution. For example, if the vehicle typically has a 50/50 torque split, then the torque split may be restored to the original torque split after both the front wheels/axle/motor and rear wheels/axle/motor have traversed the road disturbance.

Although the subject matter has been described in language specific to structural features and/or methodological acts, it is to be understood that the subject matter defined in the appended claims may not necessarily be limited to the described features or acts described above. Rather, the described features and acts are disclosed as example forms of implementing the claims.

The machine (e.g., computer system) 400 may include any combination of the illustrated components. For example, the machine 400 may include a hardware processor 402 (e.g., a central processing unit (CPU), a graphics processing unit (GPU), a tensor processing unit (TPU) including an artificial intelligence application-specific integrated circuit (ASIC), a hardware processor core, or any combination thereof), a main memory 404 and a static memory 406, some or all of which may communicate with each other via an interlink (e.g., bus) 408. The machine 400 may further include a power management device 432, a graphics display device 410, an alphanumeric input device 412 (e.g., a keyboard), and a user interface (UI) navigation device 414 (e.g., a mouse). In an example, the graphics display device 410, alphanumeric input device 412, and UI navigation device 414 may be a touch screen display. The machine 400 may additionally include a storage device (i.e., drive unit) 416, a signal generation device 418 (e.g., a data signal), a network interface device/transceiver 420 coupled to antenna(s) 430, and one or more sensors 428, such as a sound detecting sensor (e.g., a microphone), accelerometers, magnetometers, location sensors, and the like. The machine 400 may include an output controller 434, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, other sensors, etc.)).

In various embodiments, torque vectoring control unit 434 refers to software and/or hardware that implements torque vectoring techniques as described throughout this disclosure, for example, in connection with techniques discussed in FIGS. 1-3. In various embodiments, torque vectoring control unit 434 provides torque biasing capabilities and is implemented as a computer-based system that controls how much power a vehicle's engine or motors sends to individual wheels or axels.

The storage device 416 may include a machine readable medium 422 on which is stored one or more sets of data structures or instructions 424 (e.g., software) embodying or utilized by any one or more of the techniques or functions described herein. The instructions 424 may also reside, completely or at least partially, within the main memory 404, within the static memory 406, or within the hardware processor 402 during execution thereof by the machine 400. In an example, one or any combination of the hardware processor 402, the main memory 404, the static memory 406, or the storage device 416 may constitute machine-readable media.

While the machine-readable medium 422 is illustrated as a single medium, the term "machine-readable medium" may include a single medium or multiple media (e.g., a centralized or distributed database, and/or associated caches and servers) configured to store the one or more instructions 424.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 400 and that cause the machine 400 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 424 may further be transmitted or received over a communications network 426 using a transmission medium via the network interface device/transceiver 420 utilizing any one of a number of transfer protocols (e.g., frame relay, internet protocol (IP), transmission control protocol (TCP), user datagram protocol (UDP), hypertext transfer protocol (HTTP), etc.). Example communications networks may include DOCSIS, fiber optic, a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 420 may include one or more physical jacks (e.g., Ethernet, coaxial, or phone jacks) or one or more antennas to connect to the communications network 426. In an example, the network interface device/transceiver 420 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 400 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cable box, a wearable smart device, cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a wearable smart device, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, DOCSIS, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Implementations of the systems, apparatuses, devices, and methods disclosed herein may comprise or utilize a special purpose or general-purpose computer including computer hardware, such as, for example, one or more processors and system memory, as discussed herein. Computer-executable instructions comprise, for example, instructions and data which, when executed at a processor, cause a general-purpose computer, special purpose computer, or special purpose processing device to perform a certain function or group of functions. An implementation of the devices, systems and methods disclosed herein may communicate over a computer network. A "network" is defined as one or more data links that enable the transport of electronic data between computer systems and/or modules and/or other electronic devices.

Although the subject matter has been described in language specific to structural features and/or methodological acts, it is to be understood that the subject matter defined in the appended claims may not necessarily be limited to the described features or acts described above. Rather, the described features and acts are disclosed as example forms of implementing the claims.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A vehicle, comprising:
   a torque vectoring system for independently varying torque to a plurality of wheels;
   an external sensor suite;
   a control unit comprising:
      one or more processors; and
      memory storing executable instructions that, as a result of execution by the one or more processors, cause the one or more processors to:
         determine that the vehicle is approaching a road disturbance;
         calculate a first time when first one or more wheels of a front axle of the vehicle are expected to traverse the road disturbance;
         calculate a second time when second one or more wheels of a rear axle of the vehicle are expected to traverse the road disturbance;
         determine a first torque split for the vehicle to apply at the first time, wherein the first torque split biases torque away from the front axle and toward the rear axle;
         at the first time, cause the first torque split to be implemented;
         determine a second torque split for the vehicle to apply at the second time, wherein the second torque split biases torque away from the rear axle and toward the front axle; and
         at the second time, cause the second torque split to be implemented.

2. The vehicle of claim 1, wherein:
   the first torque split is a 0/100 torque split; and
   the second torque split is a 100/0 torque split.

3. The vehicle of claim 1, wherein the one or more processors are further configured to:
   determine an original torque split prior to the first time; and
   cause the original torque split to be restored after the rear axle traverses the road disturbance.

4. The vehicle of claim 1, wherein the external sensor suite is used to identify the road disturbance.

5. The vehicle of claim 1, wherein a dataset of road disturbances is used to identify the road disturbance.

6. The vehicle of claim 1, wherein the one or more processors are further configured to:
   determine an estimated torque needed to traverse the road disturbance;
   determine a torque capability of the rear axle;
   determine whether the rear axle is capable of meeting the estimated torque needed to traverse the road disturbance;
   in response to a determination that the rear axle is capable, cause the torque to be entirely shifted to the rear axle at the first time; and
   in response to a determination that the rear axle is incapable, cause the torque to be partially shifted to the rear axle at the first time.

7. The vehicle of claim 1, wherein the one or more processors are further configured to:
   determine a severity of the road disturbance; and
   determine that the severity of the road disturbance meets a minimum severity to respond to.

8. A method, comprising:
- determining, by one or more processors of a vehicle, that the vehicle is approaching a road disturbance;
- calculating, by the one or more processors of the vehicle, a first time when first one or more wheels of a front axle of the vehicle are expected to traverse the road disturbance;
- calculating, by the one or more processors of the vehicle, a second time when second one or more wheels of a rear axle of the vehicle are expected to traverse the road disturbance;
- determining, by the one or more processors of the vehicle, a first torque split for the vehicle to apply at the first time, wherein the first torque split biases torque away from the front axle and toward the rear axle;
- at the first time, causing, by the one or more processors of the vehicle, the first torque split to be implemented;
- determining, by the one or more processors of the vehicle, a second torque split for the vehicle to apply at the second time, wherein the second torque split biases torque away from the rear axle and toward the front axle; and
- at the second time, causing, by the one or more processors of the vehicle, the second torque split to be implemented.

9. The method of claim 8, wherein:
- the first torque split is a 0/100 torque split; and
- the second torque split is a 100/0 torque split.

10. The method of claim 8, further comprising:
- determining, by the one or more processors of the vehicle, an original torque split prior to the first time; and
- causing, by the one or more processors of the vehicle, the original torque split to be restored after the rear axle traverses the road disturbance.

11. The method of claim 8, wherein an external sensor suite of the vehicle is used to identify the road disturbance.

12. The method of claim 8, wherein a dataset of road disturbances is used to identify the road disturbance.

13. The method of claim 8, further comprising:
- determining, by the one or more processors of the vehicle, an estimated torque needed to traverse the road disturbance;
- determining, by the one or more processors of the vehicle, a torque capability of the rear axle;
- determining, by the one or more processors of the vehicle, whether the rear axle is capable of meeting the estimated torque needed to traverse the road disturbance;
- in response to a determination that the rear axle is capable, causing, by the one or more processors of the vehicle, the torque to be entirely shifted to the rear axle at the first time; and
- in response to a determination that the rear axle is incapable, causing, by the one or more processors of the vehicle, the torque to be partially shifted to the rear axle at the first time.

14. The method of claim 8, further comprising:
- determining, by the one or more processors of the vehicle, a severity of the road disturbance; and
- determining, by the one or more processors of the vehicle, that the severity of the road disturbance meets a minimum severity to respond to.

15. A non-transitory computer-readable medium storing a plurality of computer-readable instructions executable by one or more processors that, as a result of execution, cause the one or more processors to:
- determine that a vehicle is approaching a road disturbance;
- calculate a first time when first one or more wheels of a front axle of the vehicle are expected to traverse the road disturbance;
- calculate a second time when second one or more wheels of a rear axle of the vehicle are expected to traverse the road disturbance;
- determine a first torque split for the vehicle to apply at the first time, wherein the first torque split biases torque away from the front axle and toward the rear axle;
- at the first time, cause the first torque split to be implemented;
- determine a second torque split for the vehicle to apply at the second time, wherein the second torque split biases torque away from the rear axle and toward the front axle; and
- at the second time, cause the second torque split to be implemented.

16. The non-transitory computer-readable medium of claim 15, wherein:
- the first torque split is a 0/100 torque split; and
- the second torque split is a 100/0 torque split.

17. The non-transitory computer-readable medium of claim 15, wherein the one or more processors are further configured to:
- determine an original torque split prior to the first time; and
- cause the original torque split to be restored after the rear axle traverses the road disturbance.

18. The non-transitory computer-readable medium of claim 15, wherein an external sensor suite of the vehicle is used to identify the road disturbance.

19. The non-transitory computer-readable medium of claim 15, wherein a dataset of road disturbances is used to identify the road disturbance.

20. The non-transitory computer-readable medium of claim 15, wherein the one or more processors are further configured to:
- determine an estimated torque needed to traverse the road disturbance;
- determine a torque capability of the rear axle;
- determine whether the rear axle is capable of meeting the estimated torque needed to traverse the road disturbance;
- in response to a determination that the rear axle is capable, cause the torque to be entirely shifted to the rear axle at the first time; and
- in response to a determination that the rear axle is incapable, cause the torque to be partially shifted to the rear axle at the first time.

* * * * *